July 22, 1924.

W. A. TASKER

BRACKET

Filed Feb. 13, 1922     2 Sheets-Sheet 1

1,502,280

W. A. Tasker
INVENTOR

BY Victor J. Evans
ATTORNEY

WITNESS:

July 22, 1924.
W. A. TASKER
BRACKET
Filed Feb. 13, 1922
1,502,280
2 Sheets-Sheet 2
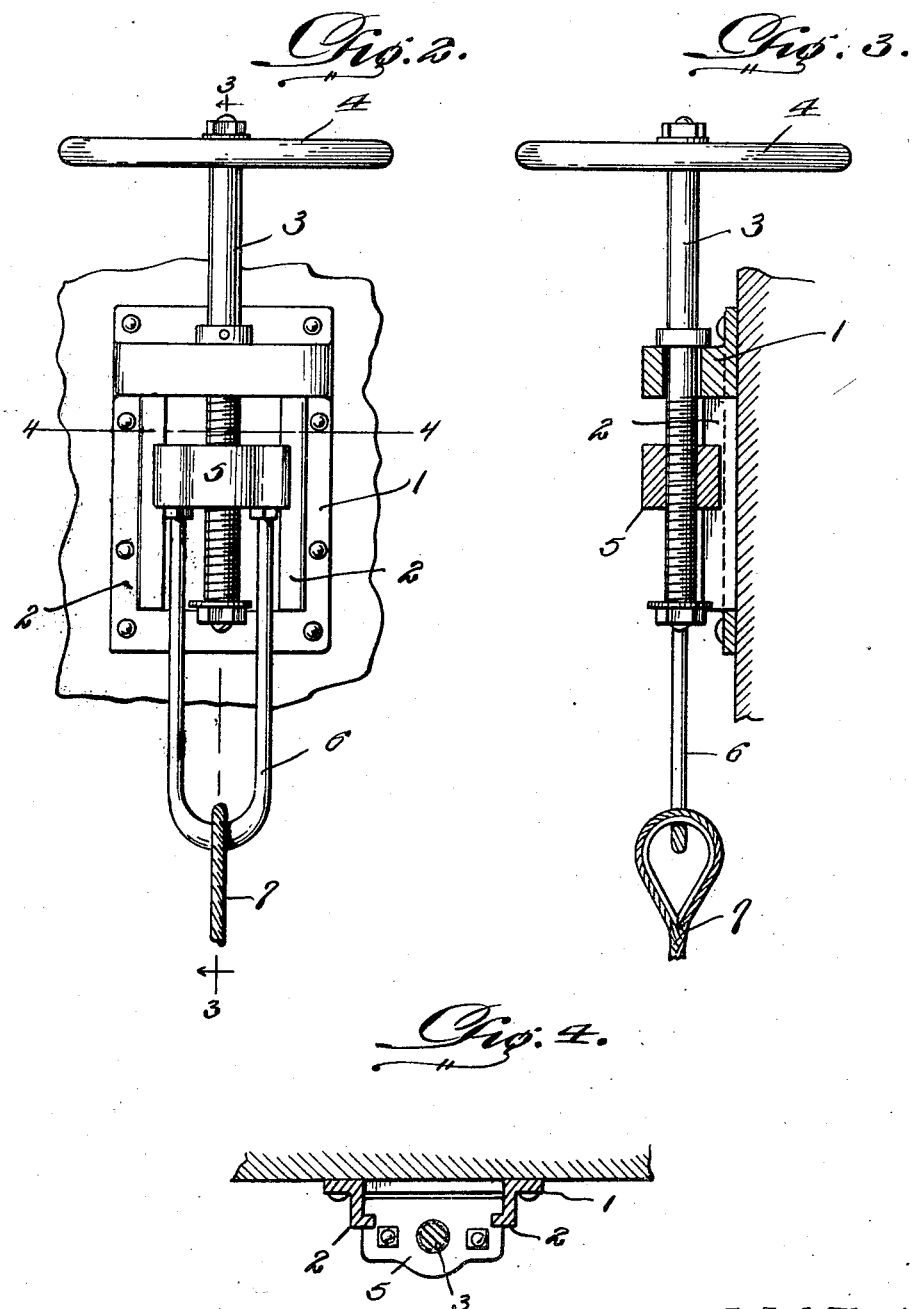

Patented July 22, 1924.

1,502,280

UNITED STATES PATENT OFFICE.

WILLIAM A. TASKER, OF VINDEX, MARYLAND.

BRACKET.

Application filed February 13, 1922. Serial No. 536,238.

*To all whom it may concern:*

Be it known that I, WILLIAM A. TASKER, a citizen of the United States, residing at Vindex, in the county of Garrett and State of Maryland, have invented new and useful Improvements in Brackets, of which the following is a specification.

This invention relates to brackets primarily designed to be used on railroad freight cars and the like and its principal object is to provide a bracket having means for adjustably securing the pulley thereto in a manner whereby it may be positioned to receive the brake actuating cable intermediate its ends and which is secured to the brake and brake operating means respectively.

Another object of the invention is to substitute a cable for the usual chain so that the spring tension of the cable will give a more even distribution of the power.

This invention also consists in certain other features of construction and in the combination and arrangement of the several parts, to be hereinafter fully described, illustrated in the accompanying drawings and specifically pointed out in the appended claim.

In describing my invention in detail, reference will be had to the accompanying drawings wherein like characters denote like or corresponding parts throughout the several views, and in which:—

Figure 2 is an enlarged front view of the manually operated means.

Figure 3 is a section on line 3—3 of Figure 2.

Figure 4 is a section on line 4—4 of Figure 2.

Figure 1:
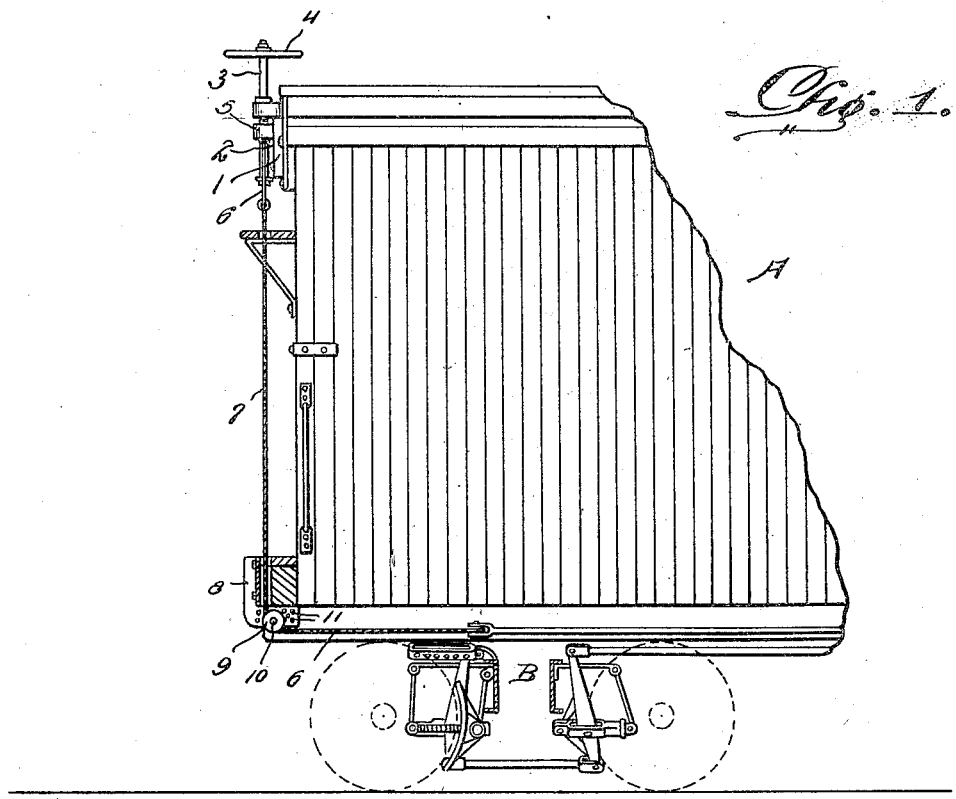
Figure 1 is a fragmentary view showing the invention in use upon a car.
Figure 5:
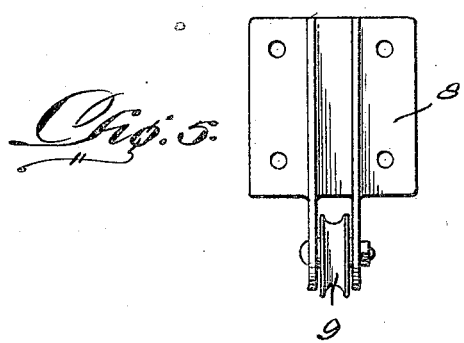
Figure 5 is a front view of the pulley supporting means.
Figure 6:
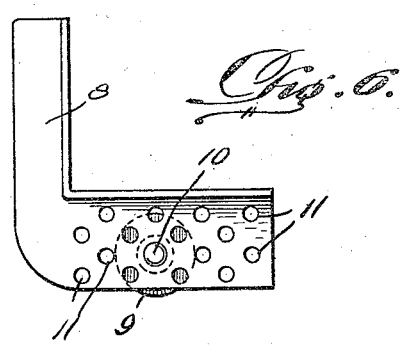
Figure 6 is a side elevation thereof.

In these views A indicates a car and B a part of the brake rigging. 1 indicates a frame which is secured to the end of the car and which forms the vertical guideway 2. A shaft 3 is journaled in this frame, the lower part of the shaft being screw threaded and the upper part having secured thereto the handle 4. A nut member 5 slidably engages the guideway and has a screw threaded hole therein for receiving the screw threaded portion of the shaft so that when the shaft is rotated by its handle the nut member will be moved vertically in the guideway. A yoke 6 has its ends secured to the nut member and one end of a wire cable 7 is connected with this yoke. The other end of the cable is connected with the brake rigging so that this cable takes the place of the usual chain for connecting the rigging with the manually operated shaft now used on cars whereby the spring tension of the cable will give a more even distribution of the power needed to actuate the brakes. A bracket 8 is secured to the bumper of the car through the medium of securing plates 7', said bracket being of angle shape as shown, and the flattened elements 8' of said bracket carries the guiding pulley 9 for the cable. This pulley is adjustably mounted on the bracket by having its shaft 10 engaging any one of a plurality of holes 11 staggeredly arranged in the flattened elements.

It will thus be seen that by moving the nut member vertically by the screw shaft the brakes can be applied and released and they are automatically held in adjusted position by the screw connection between the nut and shaft. There are no catches or ratchet mechanism which are liable to get out of order and the spring tension of the cable gives a more even distribution of the power than a chain will give. More power can be secured by this device than the type now used and the parts are easily set and released. All parts are interchangeable for repairs when necessary.

It is thought from the foregoing description that the advantages and novel features of my invention will be readily apparent.

I desire it to be understood that I may make changes in the construction and in the combination and arrangement of the several parts, provided that such changes fall within the scope of the appended claim.

What I claim is:—

The combination with a cable having manually controlled means secured to one end and its opposite end associated with an actuated means, of a fixed integrally constructed angle shaped bracket including securing plates formed on each angle portion, a pair of spaced outwardly extending flattened members arranged on the plates and following the angle thereof, a guiding pulley adjustably associated with a portion of the members through the medium of a plurality of aligned openings staggeredly arranged thereon and the said pulley receiving the cable therein in a manner whereby the ends thereof are angularly disposed with respect to each other.

In testimony whereof I affix my signature.

WILLIAM A. TASKER.